Patented Dec. 1, 1936

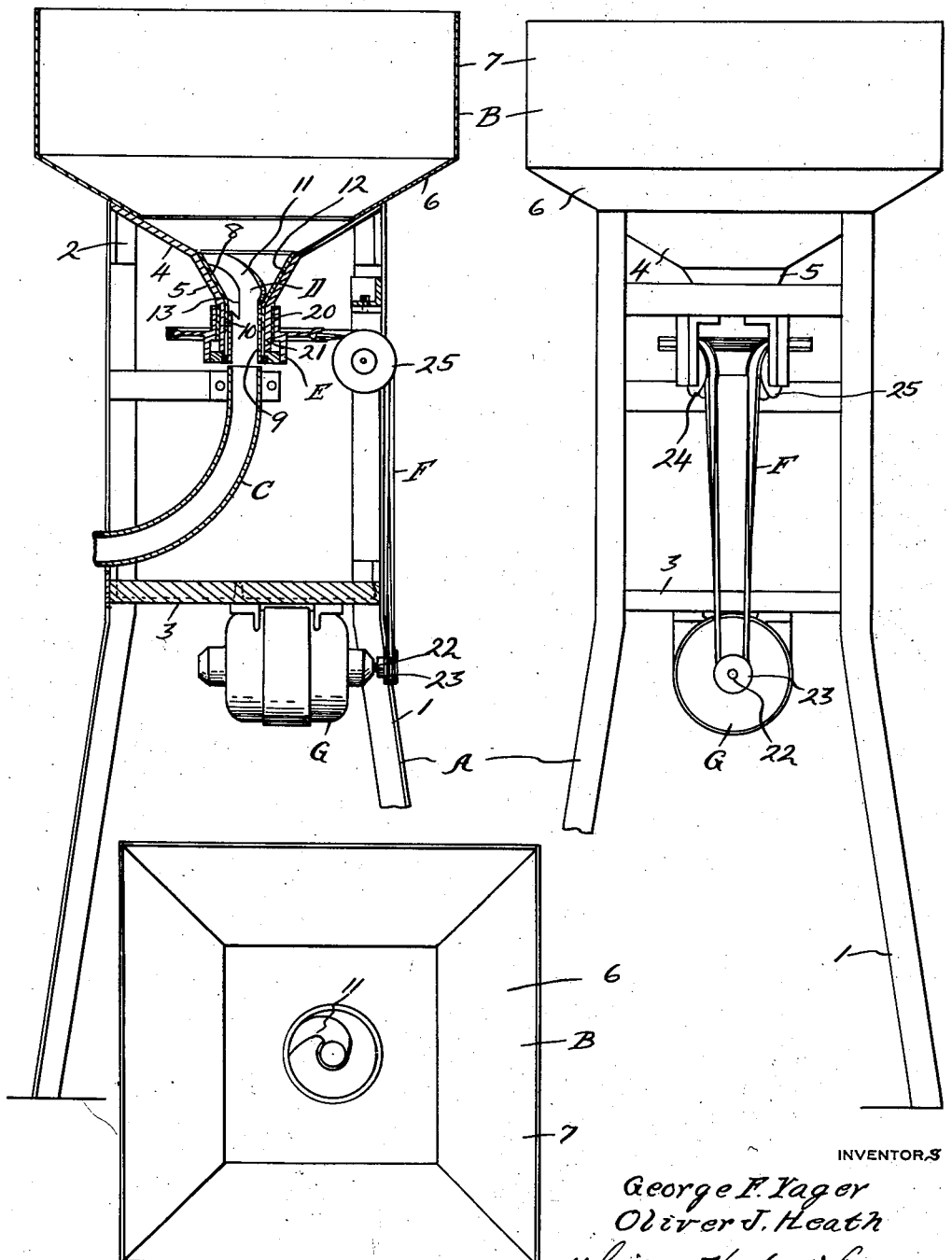

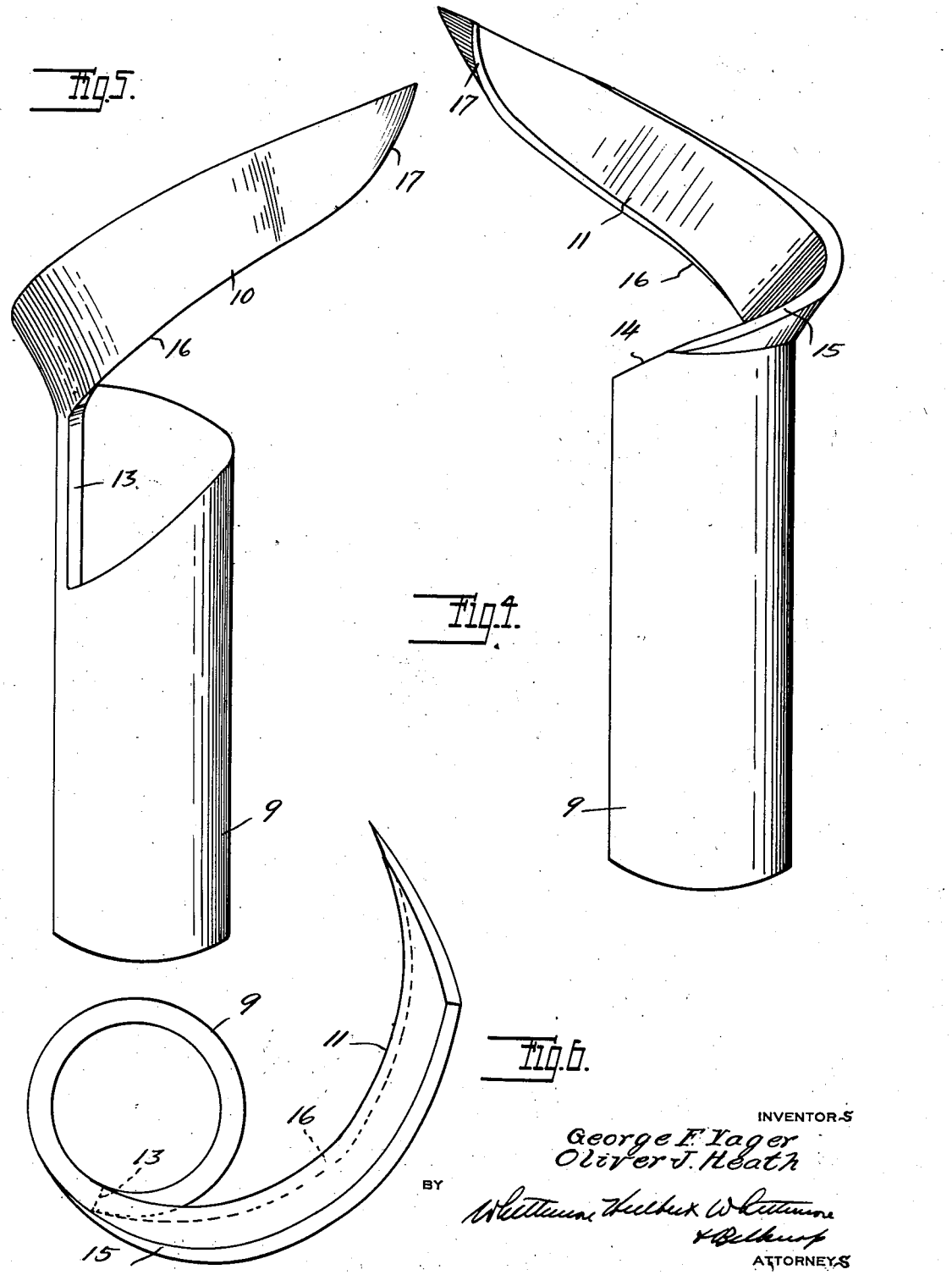

2,062,854

UNITED STATES PATENT OFFICE 2,062,854

FEEDER MECHANISM

George F. Yager and Oliver J. Heath, Toledo, Ohio, assignors to The Bunting Brass and Bronze Company, Toledo, Ohio, a corporation of Ohio Application October 5, 1931, Serial No. 567,106

19 Claims. (Cl. 221—134)

This invention comprises a machine for feeding work such as cylindrical castings or bushings to the supply chutes of metal working machines and consists of certain novel features of construction, combinations and arrangements of parts that will be hereinafter more fully described and particularly pointed out in the appended claims.

Heretofore the work for metal working machines has been fed thereto by hand with the result that an operator was required for each machine and usually was so busy feeding the castings or bushings into the supply chutes of the machines that it was practically impossible or impractical to watch the machine or to inspect the work. As a result jams occurred and machines were damaged and rendered idle.

In the present instance the difficulties just mentioned have been obviated entirely by the provision of a machine having a hopper of large capacity for the work, a chute for delivering the work in a predetermined manner to the chute of the metal working machine, and means for effecting a transfer of the work in said predetermined manner from the hopper into the delivery chute.

In the accompanying drawings:

Figure 1 is an elevation of a machine embodying our invention;

Figure 2 is a view similar to Figure 1 taken at right angles thereto and showing parts broken away and in section;

Figure 3 is a top plan view of the machine;

Figures 4, 5 and 6 respectively are detail views of the agitator.

Referring now to the drawings, A is the frame; B is the hopper; C is the delivery chute; D is the agitator, and E, F and G respectively are the agitator drive means of a machine embodying our invention. As shown, the frame A comprises the uprights 1 and upper and lower horizontally disposed cross members 2 and 3 respectively. Preferably the upper member 2 has a substantially frustro-conical portion 4 extending inwardly and downwardly from the upper end of the frame and is provided at the lower end of said portion with a depending funnel-shaped portion 5. The hopper B has a substantially frustro-conical portion 6 corresponding and secured to the inclined walls of the frustro-conical portion 4 and is provided at the upper end of said portion 6 with an open top box-like portion 7. The delivery chute C is preferably tubular in form and preferably curves downwardly from a point in vertical alignment with the lower end of the funnel-shaped portion 5 through one side of the frame A to a suitable discharge point such as the upper end of a metal working machine supply chute (not shown). The agitator D is mounted for rotary movement within the funnel-shaped portion 5 and is preferably provided with a funnel-shaped bearing 8. As shown, the agitator D has a tubular portion 9 journaled in the tubular portion 10 of the bearing 8 and is provided at the upper end of said tubular portion 9 with an offset curved wing portion 11 that substantially corresponds in curvature to and is rotatable on the conical walls 12 of the funnel-shaped bearing. Preferably the tubular portion 9 of the agitator is cut away just below the lower offset end of the wing 11 so as to provide the upright edge 13 and the upwardly curved edge 14. By referring to Figures 4, 5 and 6 it will be observed that the curved edge 14 is in substantial alignment with and merges into the upper edge 15 of the wing, while the upright edge 13 is at substantially an obtuse angle to but merges into the lower edge 16 of the wing. Preferably the lower edge 16 of the wing curves upwardly as at 17 at the free end thereof and substantially meets the upper edge 15.

E is a pulley journaled upon a tubular bearing 20 sleeved upon the tubular part 21 of the funnel-shaped portion 5 and secured below the lower end of the funnel-shaped portion 5 to the tubular portion 9 of the agitator. G is an electric motor secured to the lower horizontal member 3 of the frame and having a drive shaft 22 provided at its outer end with a pulley 23, and F is an endless belt trained about the pulleys 23 and E and a pair of intermediate pulleys 24 and 25 respectively and adapted to transmit rotary motion from the motor shaft 22 to the agitator D.

In use, the work such as cylindrical castings or bushings may be dumped in large quantities into the hopper B whereupon the wing 11 of the rotary agitator moving over the inclined walls 12 of the funnel-shaped bearing 8 will cause the work within the bearing 8 to move endwise into the tubular portion 9 of the agitator and thence into the delivery chute C. Any suitable means (not shown) may be utilized for receiving or effecting a transfer of the work from the chute C to the supply chute of a metal working machine.

While it is believed that from the foregoing description the nature and advantages of the invention will be readily apparent, we desire to have it understood that we do not limit ourselves to what is herein shown and described and that such changes may be resorted to when desired as fall within the scope of what is claimed.

What we claim as our invention is:

1. In a machine of the class described, a frame, a funnel-shaped member carried by the frame and adapted to receive cylindrical objects constituting the work, a delivery chute arranged to receive the work from the funnel-shaped member, means for effecting a transfer of the objects endwise from the member to the chute, including an agitator mounted for rotary movement in the funnel-shaped member, and means wholly below the conical portion of the funnel-shaped member for rotating said agitator, including an electric motor rigid with the frame and having a drive shaft provided with a pulley, a pulley rotatably mounted upon the funnel-shaped member and rigidly secured to the agitator at the lower end thereof, and a driving connection between said motor and agitator including an endless belt trained about the pulleys aforesaid.

2. In a machine of the class described, a substantially funnel-shaped member for receiving cylindrical articles constituting the work, a delivery chute arranged to receive the work from the member, and means for effecting a transfer of the work in a predetermined manner from the member to the chute, including a rotary agitator having a tubular portion journaled in the tubular part of the member and provided at the upper end of said portion with a laterally offset curved wing portion that is movable upon the walls of the conical part of said member, the tubular portion being cut away so as to provide an upright edge and an upwardly curved edge for engagement with the work.

3. In a machine of the class described, a substantially funnel-shaped member for receiving cylindrical articles constituting the work, a delivery chute arranged to receive the work from the member, and means for effecting a transfer of the work in a predetermined manner from the member to the chute, including a rotary agitator having a tubular portion journaled in the tubular part of the member and provided at the upper end of said portion with a laterally offset curved wing portion that is movable upon the walls of the conical part of said member, the tubular portion being cut away so as to provide an upright edge and an upwardly curved edge for engagement with the work, the curved edge being substantially in alignment with and merging into the upper edge of the wing, and the upright edge being substantially at an obtuse angle to but merging into the lower edge of the wing.

4. In a machine of the class described, a substantially funnel-shaped member for receiving cylindrical articles constituting the work, a delivery chute arranged to receive the work from the member, and means for effecting a transfer of the work in a predetermined manner from the member to the chute, including a rotary agitator having a tubular portion journaled in the tubular part of the funnel-shaped member and having an offset curved wing portion, the upper and lower edges of said wing portion curving upwardly and substantially meeting at the free ends thereof, and the tubular portion of said agitator being cut away so as to provide an upright edge that connects into the lower edge of the wing portion and a curved edge that connects into the upper edge of the wing portion.

5. In a machine of the class described, a substantially funnel-shaped bearing for receiving cylindrical objects constituting the work, a delivery chute arranged to receive the work from said bearing, means for effecting a transfer of the work in a predetermined manner from the bearing to the chute including a rotary agitator having a tubular portion journaled in the tubular portion of the bearing and having a depending extension below said tubular portion, and means for rotating the agitator including a pulley sleeved upon the tubular portion of the bearing and having a depending portion rigidly secured to said depending extension.

6. In a machine of the class described, a container for cylindrical articles, and means for effecting a discharge of such articles endwise from the container including a rotary agitator having a tubular portion journaled in a part of the container and provided at the upper end of said portion with a laterally offset curved wing portion that is movable over the bottom of the container, the tubular portion being cut away so as to provide an upright edge and an upwardly curved edge for engagement with the articles.

7. In a machine of the class described, a container for cylindrical articles, and means for effecting a discharge of such articles endwise from the container including a rotary agitator having a tubular portion journaled in a part of the container and provided at its upper end with a laterally offset curved wing portion that is movable over the bottom of the container, the tubular portion being cut away so as to provide an upright edge, and an upwardly curved edge for engagement with the articles, the curved edge being substantially in alignment with and merging into the upper edge of the wing, and the upright edge being substantially at an obtuse angle to but merging into the lower edge of the wing.

8. In a machine of the class described, a container for cylindrical articles, and means for effecting a discharge of such articles endwise from the container including a rotary agitator having a tubular portion journaled in a part of the container and having an offset curved wing portion, the upper and lower edges of said wing portion curving upwardly and substantially meeting at the free ends thereof, and the tubular portion of said agitator being cut away so as to provide an upright edge that connects into the lower edge of the wing portion and a curved edge that connects into the upper edge of the wing portion.

9. In a machine of the class described, a hopper for the work, a funnel-shaped bearing for receiving work discharged from the hopper, and a support for the hopper having means supporting the bearing, a delivery chute, means for effecting a transfer of work from the bearing to the chute, and actuating means for the last mentioned means including rotatable means associated with the supporting means aforesaid and rigid with the transfer means.

10. In a machine of the class described, a hopper for the work, a bearing for receiving work discharged from the hopper, and a support for the hopper having means supporting the bearing, a delivery chute, means for effecting a transfer of work from the bearing to the chute, and actuating means for the last mentioned means including means movable about the supporting means aforesaid and connected to the transfer means.

11. In a machine of the class described, a hopper for the work, a bearing for receiving work discharged from the hopper, and a support for the hopper having means supporting the bearing, a delivery chute, means for effecting a transfer of work from the bearing to the chute, and actuating means for the last mentioned means including rotatable means sleeved on the supporting means aforesaid and connected to the transfer means.

12. In a machine of the class described, a hopper for the work, a bearing for receiving work from the hopper, means for supporting the hopper, means associated with the means just mentioned for supporting said bearing, means for effecting a transfer of work from the bearing to the chute, and actuating means for the last mentioned means including rotatable means sleeved upon a portion of the supporting means aforesaid.

13. In a machine of the class described, a hopper for the work, a bearing for receiving work from the hopper, a frame supporting the hopper and having a tubular portion receiving the bearing, means for effecting a transfer of work from the bearing to a chute, and actuating means for the last mentioned means including rotatable means sleeved upon the tubular portion of the frame.

14. In a machine of the class described, a hopper for the work, a bearing for receiving work from the hopper, a frame supporting the hopper and having a tubular portion receiving the bearing, means for effecting a transfer of work from the bearing to a chute, including a rotary agitator in the bearing having a portion forming a duct for the work, and actuating means for the agitator including means movable about the tubular portion of the frame and rigid with the duct portion of the agitator.

15. In a machine of the class described, a hopper for the work, a bearing for receiving work from the hopper, a frame supporting the hopper and having a tubular portion receiving the bearing, means for effecting a transfer of work from the bearing to a chute, including a rotary agitator in the bearing having a portion forming a duct for the work, and actuating means for the agitator including a rotatable member on the tubular portion of the frame and connected to the duct portion of the agitator.

16. In a machine of the class described, a hopper for the work, a bearing for receiving work from the hopper, a frame supporting the hopper and having a tubular portion receiving the bearing, means for effecting a transfer of work from the bearing to a chute, including a rotary agitator in the bearing having a portion forming a duct for the work, and means associated with the tubular portion of the frame for rotating the agitator including a member rigid with the duct portion of the agitator.

17. In a machine of the class described, a container for work, means for effecting a transfer of work endwise from said container to a chute, including a rotary agitator having a tubular portion forming a duct for the work and provided at one end with an elongated wing portion, said tubular portion being cut away to provide a substantially straight edge at one longitudinal edge of the wing and a curved edge that extends from said straight edge to the other longitudinal edge of the wing.

18. In a machine of the class described, a hopper for the work, a bearing for receiving work from the hopper, a frame supporting the hopper and having a portion supporting the bearing, means for effecting a transfer of work from the bearing to a chute, and actuating means for the last mentioned means including rotatable means carried by the portion aforesaid of the frame.

19. In a machine of the class described, a hopper for the work, a bearing for receiving work from the hopper, a frame supporting the hopper and having a portion supporting the bearing, means for effecting a transfer of work from the bearing to a chute, including a rotary agitator in the bearing having a portion forming a duct for the work, and actuating means for the agitator including means movable about the portion aforesaid of the frame and rigid with the duct portion of the agitator.

GEORGE F. YAGER.
OLIVER J. HEATH.